United States Patent [19]

Meyer

[11] 4,265,026

[45] May 5, 1981

[54] INTERNAL MEASURING DEVICE

[76] Inventor: Hans Meyer, Rue du Bugnon, 24, Renens, Vaud, Switzerland

[21] Appl. No.: 22,501

[22] Filed: Mar. 21, 1979

[30] Foreign Application Priority Data

Apr. 5, 1978 [CH] Switzerland ..................... 3632/78

[51] Int. Cl.³ .............................................. G01B 5/12
[52] U.S. Cl. ................................. 33/178 R; 33/147 K
[58] Field of Search ......................... 33/147 K, 178 R

[56] References Cited

U.S. PATENT DOCUMENTS

| 2,805,481 | 9/1957 | Locke, Sr. | 33/147 K |
| 2,812,588 | 11/1957 | Verrant | 33/147 K |
| 3,054,189 | 9/1962 | Coulson | 33/147 K |
| 3,292,266 | 12/1966 | Smith | 33/178 R |
| 3,766,655 | 12/1973 | Cho | 33/178 R |

FOREIGN PATENT DOCUMENTS 825749 12/1951 Fed. Rep. of Germany ........ 33/147 K

Primary Examiner—Richard R. Stearns
Attorney, Agent, or Firm—Emory L. Groff, Jr.

[57] ABSTRACT

An internal measuring device with a measuring unit comprising a measuring bolt and a fixed measuring contact. In order to facilitate the centering of the device inside the bore for measurement to be made the fixed contact member is provided with at least one roller. This ensures that the device moves automatically into the central plane of the bore to be measured.

2 Claims, 7 Drawing Figures

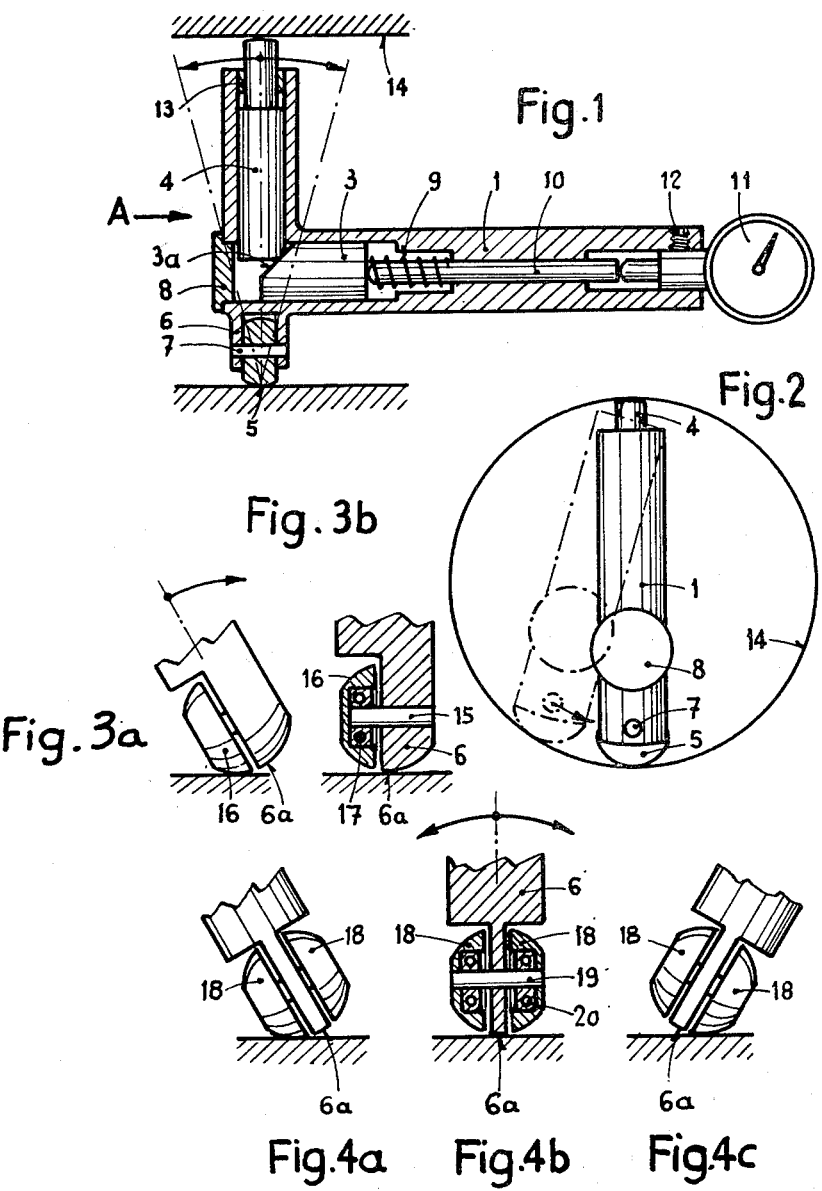

INTERNAL MEASURING DEVICE

Internal measuring devices are known which measure bore dimensions by the so-called two-point-method. For measurement, these devices are inserted into the bore with the probes set at a given angle relative to the bore axis, to be swivelled, when reaching the bore plane, into a position perpendicular to the bore axis. The minimum distance measured after making this adjustment between two opposite points defines the bore dimension. In order to avoid measuring errors when using this method the measuring device must be accurately centered in the lateral directions before it may be swivelled into its measuring position. This adjustment is made with the aid of an auxiliary centering device comprising a spring loaded bridge which supports the measuring device symetrically against the bore wall while making the adjustment. The width of this bridge which determines the centering effect obviously restricts the practical application of the measuring instrument to a given maximum bore diameter. In other words the measuring range of these internal measuring devices is defined by functional limits of the centering device. With known internal measuring devices of the kind described above the ratio defining the smallest and the largest acceptable bore diameters is thus approximately 2. Apart from this restriction there are the relatively high manufacturing demands to be taken into account which have to be made with respect to the accuracy of the centering device. As a result of this requirement the manufacturing cost of the measuring instrument is correspondingly high.

It is an object of this invention to obviate or mitigate the drawbacks described above.

The invention relates to an internal measuring device including a measuring unit with a fixed measuring contact member, a movable contact member supported in the measuring unit, a transmission element which is connected with the movable contact member, an indicator element and a spring acting on the movable contact member to urge it outwardly, wherein at least one of the contact members is provided with at least one roller adapted to support the measuring device on the bore wall to be measured at least during part of the measuring process and as a result of its directional force ensuring that the device is centrally located in the bore.

The bridge shaped centering device used with known measuring instruments is thus replaced by one or several rollers loaded by a spring whose compressive force is directed against the measured bore wall so that the instrument is automatically adjusted symmetrically to the bore axis. The centering effect of the assembly according to the invention is attributable to the rolling friction which replaces the sliding friction of the units used with the principle of the bridge device. Not only does this help to increase the diameter-range of the measuring instrument. It also helps to ensure that the manufacturing cost is much more favourable than that of known systems.

Embodiments of the present invention will now be described by way of example only with reference to the accompanying drawings, in which:

FIG. 1 is a longitudinal section through an internal measuring device;

FIG. 2 shows the device according to FIG. 1 as it is seen in the direction of arrow A;

FIGS. 3a and 3b show a fixed contact member of an internal measuring device of the kind shown in FIG. 1, which, however, is provided with a centering roller capable of being axially displaced in relation to the axis of the contact member, the centering position being shown in FIG. 3a and the measuring position, in FIG. 3b; and FIGS. 4a, 4b and 4c show a fixed measuring contact of an internal measuring device of the kind shown in FIG. 1 which, however, is provided with two centering rollers which are axially displaced in relation to the axis of the contact member, in opposite directions. FIGS. 4a and 4c presenting centering positions, while the measuring position is shown sectionally in FIG. 4b.

An internal measuring device according to the FIGS. 1 and 2 consists of a measuring unit 1 which in addition to a movable transmitting element 3 with an inclined surface 3a comprises a measuring bolt 4 which is movable across the direction of the instrument axis. The element 3, loaded by a spring 9, presses the measuring bolt 4 against the wall 14 of the bore to be measured. The movements of the measuring bolt are transmitted by means of a rod mechanism 10 in the usual manner to a dial gauge 11 which is fixed to the measuring unit 1 with the aid of a screw 12. The front section of the measuring unit 1 is closed with a cover 8. A roller 5, pivoted on a pin 7 in the section 6 of the measuring unit, constitutes the fixed contact member of the measuring instrument.

The dimensions of the measured bores are determined as follows: The measuring device is inserted into the bore, and, using the fixed contact member as a fulcrum, is swivelled round inside the bore in the direction indicated in FIG. 1 by arrows. During this rotational movement the minimum dimension is determined which corresponds to the bore diameter.

If the measuring device were to be inserted into the bore in a laterally displaced position—this is shown in FIG. 2 by the chain-dotted lines, in an exaggerated representation—the roller 5 which is indirectly pressed against the bore wall 14 by the spring 9 would ensure that the device returns into its operating position which is symmetrical relative to the bore axis. It is due to this corrective movement that the measuring device aligns accurately with the bore diameter while the actual measurements are taken.

The centering effect depends on the extent of friction between the roller 5 and the bore wall 14. It is therefore advisable in order to obtain small friction values, that the centering roller should be supported in roller bearings as is shown in the FIGS. 3b and 4b. Since the effects of out-of-roundness of the roller on the measuring result would falsify the latter this adverse effect had to be eliminated from the measuring phase. The solution is indicated in the Figures referenced 3 and 4. According to FIG. 3a the centering roller 16, supported in a ball bearing 17 on a pin 15 which is sunk into the section 6 of the measuring unit is the only element in direct contact with the bore wall when the measuring device assumes an inclined position. The end section 6a cannot be in contact with the wall before the measuring device resumes its perpendicular position relative to the bore axis during the actual measuring phase. When this occurs, however, the roller 16 is out of action because it no longer touches the bore wall. Thus any direct effects of the centering roller on the measuring results and cancelled during measurements. See FIG. 3b.

The embodiment according to FIGS. 3a and 3b enables the device to be swivelled in one direction only. The embodiment shown in FIGS. 4a, 4b and 4c permits swivelling it in both directions. The shaft 19 carries on either side of the measuring contact 6 centering rollers 18 in ball bearings 20, which are effective in both swivel-positions as illustrated by FIGS. 4a and 4c, whereas in the central position shown in FIG. 4b which is the measuring position, only the fixed stop 6a is in contact with the wall.

With all embodiments the shaft supporting the roller or rollers respectively extends parallel to the longitudinal axis of the measuring unit 1.

The roller or rollers could also be adapted to the movable measuring bolt and the function of the measuring device remain unchanged.

I claim:

1. An internal measuring device including a measuring unit with a fixed contact member, a movable contact member supported in the measuring unit, a transmission element engaging said movable contact member, an indicator gauge mounted in said measuring unit in engagement with said transmission element and a spring acting on the movable contact member to urge it outwardly, wherein at least one of the contact members is provided with at least one roller supporting the measuring device on the bore wall to be measured at least during part of the measuring process and, as a result of its directional force, ensuring that said device is centrally located in the bore, one roller located on one side of the fixed contact member so that it supports itself on the bore wall when the device is inclined relative to the bore axis and thus carries out its centering function whereas the fixed contact member supports itself on the bore wall when the measuring units assumes its perpendicular position relative to the bore axis.

2. An internal measuring device including a measuring unit with a fixed contact member, a movable contact member supported in the measuring unit, a transmission element engaging said movable contact member, an indicator gauge mounted in said measuring unit in engagement with said transmission element and a spring acting on the movable contact member to urge it outwardly, wherein at least one of the contact members is provided with a least one roller supporting the measuring device on the bore wall to be measured at least during part of the measuring process and, as a result of its directional force, ensuring that said device is centrally located in the bore, one roller located on each side of the fixed contact member and alternately touching the bore wall while the device is inclined towards the bore axis, thus carrying out their centering function, whereas the device supports itself on the bore wall through the fixed contact member when it is perpendicular to the bore axis.

* * * * *